United States Patent Office 2,752,234
Patented June 26, 1956

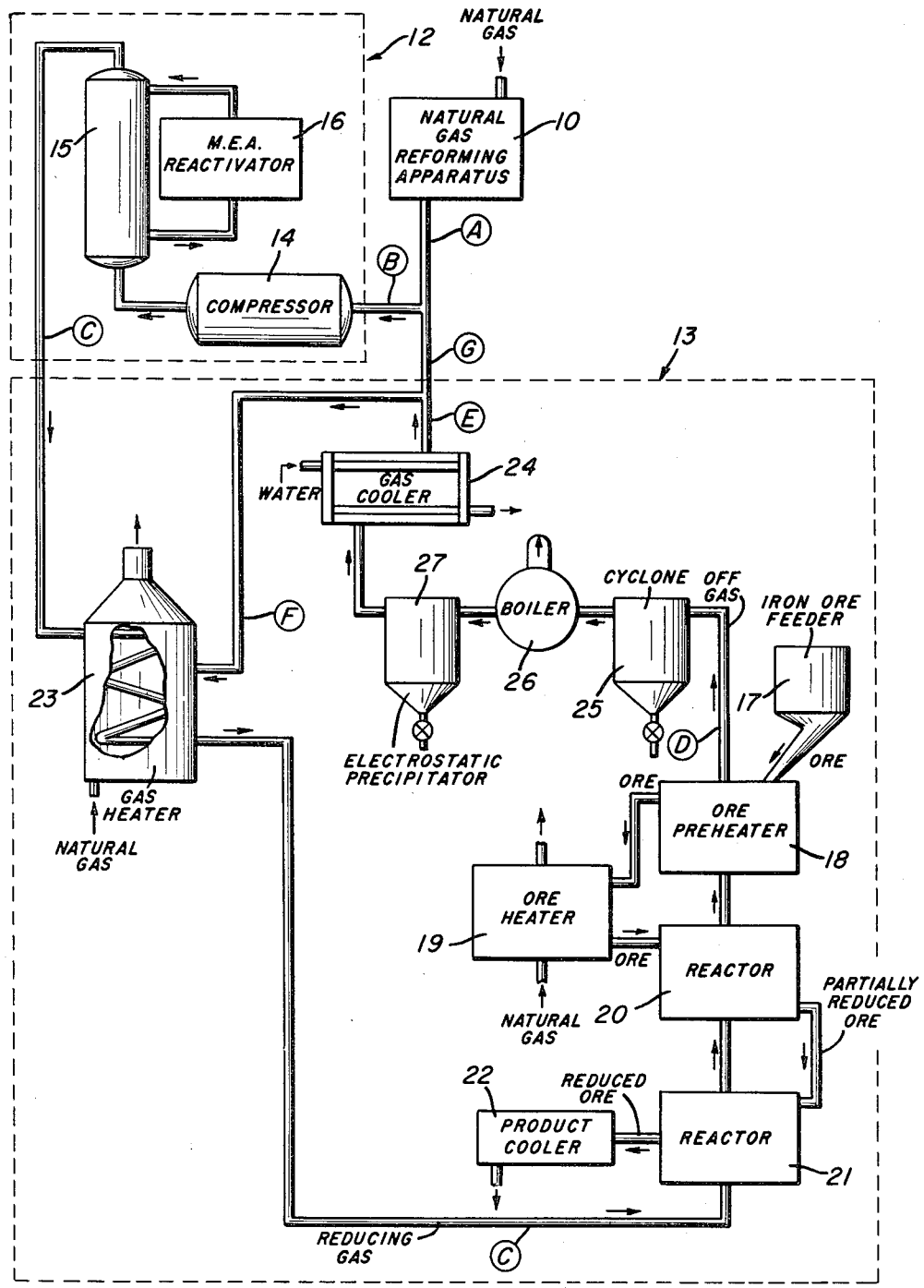

2,752,234

PROCESS FOR CONTINUOUS GASEOUS REDUCTION OF IRON ORE IN A FLUIDIZED BED SYSTEM

Earl H. Shipley, Homewood Township, Cook County, Ill., assignor to United States Steel Corporation, a corporation of New Jersey Application July 7, 1955, Serial No. 520,427

3 Claims. (Cl. 75—26)

This invention relates to an improved process for direct reduction of iron ore to metallic iron in a fluidized bed system.

The usual procedure for reducing iron ore directly involves contacting it at elevated temperatures with a reducing gas, such as hydrogen or carbon monoxide or mixtures thereof. Such processes can be carried out with ore of relatively coarse particle size in static beds or finer particle size in beds fluidized by ascending gas currents. In static beds fines interfere with permeability and must be agglomerated before reduction; hence fluidized beds generally are preferred. Similar procedures can be used either for reducing ferric oxide ores to magnetite to permit magnetic separation of the reduced product, or for reducing ore of either type to metallic iron, the main distinction being in the degree to which reduction is carried.

An object of the present invention is to provide an improved direct reduction process which produces metallic iron from ore in fluidized beds on a continuous, highly efficient basis.

A further object is to provide an improved process of the foregoing type wherein a reducing gas consisting essentially of a hydrogen-carbon monoxide mixture is continuously recycled, spent gas being regenerated after withdrawal of a predetermined portion to purge nitrogen and addition of newly prepared reducing gas to replace both that consumed and that withdrawn.

In accomplishing these and other objects of the invention, I have provided improved details of structure, a preferred form of which is shown in the accompanying drawing, in which:

The single figure is a schematic flow sheet of a process performed in accordance with my invention.

The equipment for my process comprises essentially a natural gas reforming apparatus 10, a purifying apparatus 12 for both reformed natural gas and spent reducing gas, and a reduction system 13. The reforming apparatus 10 can include any conventional catalytic means for converting desulphurized natural gas to a mixture of hydrogen and carbon monoxide and preferably means for cooling the product, of which many are known and patented. The purifying apparatus 12 includes a compressor 14, a means 15 for absorbing carbon dioxide preferably employing monoethanolamine (MEA) as an absorbing medium, and a reactivator 16 for this medium, plus the usual pumps and heat exchangers, not shown. The compressor 14 preferably is situated ahead of the absorption means 15 to improve the efficiency of the latter. Inasmuch as both the reforming apparatus and purifying apparatus per se are of conventional construction and operation, no more detailed showing is deemed necessary.

The reduction system 13 includes essentially an ore feeder 17, an ore preheater 18, an ore heater 19, primary and secondary reactors 20 and 21, a product cooler 22, a gas heater 23, and a gas cooler 24. An oxide iron ore, in which at least part of the iron is in the ferric state, and which is of suitable fineness for fluidization (minus ¼ or ⅜ inch), is introduced to the feeder 17. From the feeder the ore flows successively through the preheater 18, heater 19, reactors 20 and 21 and product cooler 22. At the same time reducing gas from the purifying apparatus 12 flows successively through the gas heater 23, reactors 21 and 20, preheater 18, and cooler 24 counter to the ore flow. Preferably the gas also passes through a cyclone 25, a waste heat boiler 26 and an electrostatic precipitator 27 intermediate the preheater 18 and cooler 24, although these devices are ancillary to my process. The preheater 18, heater 19 and reactors 20 and 21 are heat insulated vessels in which solid particles can be maintained as fluidized beds by ascending gas currents. Inasmuch as vessels of this type per se are well known, no detailed description is deemed necessary.

In the preheater 18 the ore temperature is raised to about 700 F. from sensible heat in the off-gases from the reactors. The temperature here is not critical since the heater 19 can be operated to attain the temperature desired for the reactors. In the heater 19 the ore temperature is raised to about 1600 to 1800 F. by combustion of a suitable fuel. The sensible heat in the ore supplies heat needed for the endothermic reducing reaction in the primary reactor 20, where the bed temperature is maintained at about 1100 to 1400 F. and the iron oxide is reduced to FeO. In the gas heater 23 purified reducing gas is heated to about 1500 to 1700 F. by combustion of gaseous fuel plus a portion of the off-gases withdrawn from the reactors to purge nitrogen from the system, as hereinafter explained. The resulting sensible heat in the gas supplies heat needed for the endothermic reducing reaction in the secondary reactor 21, where the bed temperature again is maintained at about 1100 to 1400 F. and FeO is reduced to metallic iron. The iron discharged from the secondary reactor 21 is somewhat pyrophoric and hence must cool out of contact with air in the cooler 22. The cooled product can be briquetted and used for any suitable purpose, such as in an open hearth charge.

The method by which primary and secondary reactors are used to reduce the ore in two steps involves careful control of the operating conditions to approach equilibrium and is described more fully and claimed in Reed application Serial No. 520,454, filed July 7, 1955, entitled "Two Step Method of Reducing Iron Ore," and bearing common ownership. Although the reactors are shown housed in separate chambers, equivalent results can be obtained by housing both in a single chamber appropriately partitioned. The precise method of control which enables particles up to minus ¼ or ⅜ inch to be fluidized and sticking to be avoided is described more fully and claimed in Davis et al. application Serial No. 520,614, filed July 7, 1955, entitled "Process for Gaseous Reduction of Iron Ore," and bearing common ownership. Nevertheless it is apparent that my method can be used with other fluidized bed direct reduction processes wherein the Reed and Davis et al. inventions are not used.

The cooler 24 cools off-gas from the reactors to about 100 F. to condense and remove water formed in the reduction process. Leaving the cooler, the gas contains about 8 per cent carbon dioxide and is saturated with water vapor at that temperature. It also contains nitrogen, which acts as an inert impurity and would continuously build up unless removed. An important feature of my invention is that a portion of the off-gas leaving the cooler 24 is continuously withdrawn to purge nitrogen and hence limit its build-up. The portion thus withdrawn can vary widely, but I prefer to withdraw enough to hold the nitrogen content of the reducing gas at about 10 per cent. The withdrawn portion is useful only as fuel, for example in the gas heater 23, and hence its reducing constituents are used uneconomically, but this loss is balanced against the volume of nitrogen which must be heated and cooled.

The remaining off-gas joins the freshly produced reducing gas from the reforming apparatus 10. The latter gas of course replaces both the portion withdrawn to limit nitrogen build up and that consumed, and in the reducing reactions it commonly contains 5 to 6 per cent carbon dioxide. The purifying apparatus 12 effectively removes carbon dioxide from the combined gases to that the gas entering the reduction system is a more efficient reductant.

As a specific example of my process, a minus ¼ inch hematite ore in its natural state was introduced to the feeder 17 from which it fed continuously through the preheater 18, heater 19, primary and secondary reactors 20 and 21, and product cooler 22. In the preheater 18 the ore temperature was raised to 700 F. from sensible heat in the off-gas from the reactors, and in the heater 19 to 1700 F. by combustion of natural gas. The primary reactor temperature was maintained at 1300 F. and the ore are reduced therein essentially to FeO. The secondary reactor temperature also was maintained at 1300 F. and the FeO reduced therein to metallic iron. The aforementioned Reed and Davis et al. methods were employed in operating the reactors.

In the meantime compressed, desulphurized and preheated natural gas consisting chiefly of methane was passed continuously through the reforming apparatus 10, and the reformed product cooled to 100 F. This product gas was combined with gas from the coler 24 and the combined gases compressed in the compressor 14 to 60 p. s. i. gage, where the water vapor dropped from 100 F. saturation value to about 1.5%. The compressed gas was scrubbed with MEA solution in the absorbing means 15. The reducing gas thus regenerated was introduced to the gas heater 23 where its temperature was raised to 1600 F. by combustion of natural gas and off-gas withdrawn to purge nitrogen. The heated gas was introduced continuously to the secondary reactor 21 from which it passed through the primary reactor 20, preheater 18, cyclone 25, waste heat boiler 26, electrostatic precipitator 27 and coler 24, where it cooled to 100 F. Following this cooling 5 to 6 per cent by volume of the gas was withdrawn from the system to purge nitrogen and used as fuel in the gas heater 23. The remaining off-gas was combined with freshly reformed natural gas, as already explained.

The following table shows the volumes and analyses of the gas at various points in the system:

bodiment of my invention, it is apparent that modifications may arise. Therefore, I do not wish to be limited to the disclosure set forth but only by the scope of the appended claims.

I claim:

1. A continuous direct reduction process for iron ore comprising feeding iron ore of relatively fine size successively to a preheater, a heater and a reactor, heating a reducing gas whose reducing constituents consist essentially of hydrogen and carbon monoxide to about 1500 to 1700 F., introducing ascending currents of the heated reducing gas to the reactor to reduce the ore to metallic iron, introducing ascending currents of off-gas from the reactor to the preheater to preheat the ore to about 700 F., introducing ascending gas currents to the heater and burning fuel therein to heat the ore to about 1600 to 1800 F., said ascending currents maintaining ore in the reactor, heater and preheater as fluidized beds, cooling the off-gas from the preheater to about 100 F., continuously withdrawing a portion of this off-gas to limit nitrogen build up, continuously adding fresh reducing gas to the remaining off-gas to replace the portion withdrawn and consumed by reduction, regenerating the combined remaining off-gas and fresh reducing gas to eliminate carbon dioxide, re-using the regenerated gas in the reduction process, and recovering a metallic iron product from the reactor.

2. A continuous direct reduction process for iron ore comprising feeding iron ore of relatively fine size successively to a preheater, a heater, a primary reactor and a secondary reactor, heating a reducing gas whose reducing constituents consist essentially of hydrogen and carbon monoxide to about 1500 to 1700 F., introducing ascending currents of the heated reducing gas to the secondary reactor and thence to the primary reactor to reduce the ore in steps to FeO and metallic iron, introducing ascending currents of off-gas from the primary reactor to the preheater to preheat the ore to about 700 F., introducing ascending gas currents to the heater and burning fuel therein to heat the ore to about 1600 to 1800 F., said ascending currents maintaining ore in the reactors, heater and preheater as fluidized beds, cooling the off-gas from the preheater to about 100 F., continuously withdrawing a portion of this off-gas to limit nitrogen build up, continuously adding fresh reducing gas to the remaining off-gas to replace the portion withdrawn and consumed by reduction, regenerating the combined off-gas and fresh reducing gas to eliminate carbon dioxide, re-using the regenerated gas in the reduction process, and recovering a metallic iron product from the secondary reactor.

| Gas Stream in Process | Fig. 1 Ref. | Volume, S. C. F. H.[1] | $CO_2$, Percent By Volume | CO, Percent By Volume | $H_2$, Percent By Volume | $H_2O$, Percent By Volume | $N_2$, Percent By Volume |
|---|---|---|---|---|---|---|---|
| Fresh Gas (from reformed gas cooler) | A | 1,978 | 6.1 | 16.1 | 72.6 | 3.8 | 1.4 |
| Mixture of A and G | B | 5,524 | 7.2 | 12.5 | 67.5 | 3.8 | 9.0 |
| Reducing Gas (starting gas after compression and $CO_2$ removal) | C | 4,991 | 0 | 13.8 | 74.7 | 1.5 | 10. |
| Hot Spent Gas (off-gas from fluidized-bed reactors) | D | 4,991 | 5.9 | 7.9 | 48.7 | 27.5 | 10. |
| Cold Spent Gas (off-gas after cooling to 100 F.) | E | 3,761 | 7.8 | 10.5 | 64.6 | 3.8 | 13.3 |
| Purge Gas (fraction of spent gas used as fuel to remove volume of $N_2$ equal to that in the fresh gas) | F | 215 | 7.8 | 10.5 | 64.6 | 3.8 | 13.3 |
| Recycle Gas (fraction of spent-gas stream reused) | G | 3,546 | 7.8 | 10.5 | 64.6 | 3.8 | 13.3 |

[1] Cubic feet per hour reduced to standard conditions.

From the foregoing description it is seen that my invention affords a simple continuous system for direct reduction of iron ore to metallic iron in fluidized beds. The reducing gas is continuously recycled and the only significant loss is in the portion withdrawn to control nitrogen and consumed by reactors. Only a very limited quantity of additional gas must be introduced to the system.

While I have shown and described only a single em-

3. A continuous direct reduction process for iron ore comprising feeding iron ore of relatively fine size successively to a preheater, a heater, a primary reactor, and a secondary reactor, heating a reducing gas whose reducing constituents consist essentially of hydrogen and carbon monoxide to about 1500 to 1700 F., introducing ascending currents of the heated reducing gas to the secondary reactor and thence to the primary reactor to reduce the ore in steps to FeO and metallic iron, introducing ascending currents of off-gas from the primary reactor to the preheater to preheat the ore to about 700 F., introducing ascending gas currents to the heater and burning fuel therein to heat the ore to about 1600 to 1800 F., said ascending currents maintaining ore in the reactors, heater and preheater as fluidized beds, the sensible heat in the reducing gas and ore furnishing heat required for the endothermic reducing reactions, the sensible heat in the off-gas furnishing heat for preheating the ore, cooling the off-gas from the preheater to about 100 F., continuously withdrawing a portion of this off-gas to limit nitrogen build up, continuously adding fresh reducing gas to the remaining off-gas to replace the portion withdrawn and consumed by reduction, regenerating the combined off-gas and fresh reducing gas to eliminate carbon dioxide, re-using the regenerated gas in the reduction process, and recovering a metallic iron product from the secondary reactor.

References Cited in the file of this patent

UNITED STATES PATENTS

| | | |
|---|---|---|
| Re. 19,770 | Brown | Dec. 3, 1935 |
| 2,399,984 | Caldwell | May 7, 1946 |
| 2,481,217 | Hemminger | Sept. 6, 1949 |
| 2,711,368 | Lewis | June 21, 1955 |